United States Patent
Muylaert et al.

(10) Patent No.: US 8,192,159 B2
(45) Date of Patent: Jun. 5, 2012

(54) RIGID ROTOR ASSEMBLY FOR FOLDING HELICOPTER BLADES

(75) Inventors: Neal W. Muylaert, Apache Junction, AZ (US); Lyndon Claudius Lamborn, Mesa, AZ (US); Mark Stephen Durst, Laguna Beach, CA (US)

(73) Assignee: The Boeing Company, Chicago, IL (US)

( * ) Notice: Subject to any disclaimer, the term of this patent is extended or adjusted under 35 U.S.C. 154(b) by 796 days.

(21) Appl. No.: 12/326,400

(22) Filed: Dec. 2, 2008

(65) Prior Publication Data

US 2010/0135805 A1    Jun. 3, 2010

(51) Int. Cl.
*B64C 11/28*    (2006.01)
*B64C 27/50*    (2006.01)

(52) U.S. Cl. .............. 416/1; 416/134 A; 416/134 R; 416/142

(58) Field of Classification Search ............ 416/135, 416/132 B, 142, 141, 143, 135 A, 1, 134 R, 416/248

See application file for complete search history.

(56) References Cited

U.S. PATENT DOCUMENTS

| | | | |
|---|---|---|---|
| 3,428,132 A | 2/1969 | Luigi Vacca et al. | |
| 3,744,742 A | 7/1973 | Gear | |
| 3,874,817 A | 4/1975 | Ferris | |
| 3,972,491 A | 8/1976 | Ferris et al. | |
| 5,211,538 A | 5/1993 | Seghal et al. | |
| 5,782,606 A | 7/1998 | Mondet et al. | |
| 6,047,924 A | 4/2000 | Thomassin et al. | |
| 6,176,679 B1 | 1/2001 | Bietenhader | |
| 6,601,795 B1 | 8/2003 | Chen | |
| 6,745,979 B1 | 6/2004 | Chen | |
| 6,769,644 B2 | 8/2004 | Muylaert et al. | |
| 7,530,790 B2 * | 5/2009 | Cabrera et al. | 416/134 A |
| 7,559,743 B2 | 7/2009 | Jalaguier | |

* cited by examiner

*Primary Examiner* — Thomas L Dickey
*Assistant Examiner* — Nikolay Yushin
(74) *Attorney, Agent, or Firm* — Armstrong Teasdale LLP

(57) ABSTRACT

Described herein is a rigid rotor assembly configured to allow rotation of helicopter rotor blades attached to the rigid rotor assembly from a deployed position to a stowed position. The rigid rotor assembly includes a base including a shaft extending therethrough, a first spindle configured to engage the shaft, and a second spindle configured for placement onto the shaft. The second spindle is operable to maintain a first position with respect to the first spindle via an attachment mechanism therebetween, the second spindle further operable to maintain a second position with respect to the first spindle via the attachment mechanism.

9 Claims, 5 Drawing Sheets

RIGID ROTOR ASSEMBLY FOR FOLDING HELICOPTER BLADES

BACKGROUND

Large radial dimensions of helicopter rotor assemblies and the blades associated therewith result in helicopters having large structural envelopes that occupy an inordinate amount of space. It is often desirable to reduce the large structural envelopes of such helicopters to facilitate rapid deployment, routine transport, stowage, and/or to reduce vulnerability of the helicopters to environmental conditions.

One current option available to reduce the structural envelopes associated with helicopters is to design main rotors of helicopters so that main rotor blades may be temporarily removed from a rotor hub assembly (i.e., a main rotor assembly). However, main rotors may be unnecessarily complex, and/or removal of the main rotor blades may be time consuming and labor intensive. Moreover, the same time constraints and labor requirements also exist when the helicopter is reconfigured for subsequent flight operations. Further, a problem exists in this configuration in that removal of the main rotor blades may require a rebalancing of the blades upon reattachment.

Another option often used to reduce the structural envelopes of helicopters is to design main rotor assemblies and rotor blades so that the main rotor blades may be folded about the main rotor assembly. However, no such configuration is currently available because of unique requirements associated with rigid rotor assemblies.

Therefore a rigid rotor assembly is needed that allows main rotor blades to be folded (e.g., rotated) from a deployed position to a stowed position without a need for additional ground support equipment or a removal of any of the main rotor blades.

SUMMARY

In one aspect, a rigid rotor assembly configured to allow rotation of helicopter rotor blades attached to the rigid rotor assembly from a deployed position to a stowed position is provided. The rigid rotor assembly includes a base comprising a shaft extending therethrough, a first spindle configured to engage the shaft, and a second spindle configured for placement onto the shaft. The second spindle is operable to maintain a first position with respect to the first spindle via an attachment mechanism therebetween. The second spindle is also operable to maintain a second position with respect to the first spindle via the attachment mechanism.

In another aspect, a helicopter is provided. The helicopter includes a forward section, a tail section rearward of the forward section, and a rigid rotor assembly. The rigid rotor assembly is configured to allow rotation of helicopter rotor blades attached to the rigid rotor assembly from a deployed position to a stowed position. The rigid rotor assembly includes a first spindle attached to a rotor shaft, and a second spindle. The second spindle has a hub opening operable for placing the second spindle onto the shaft and further includes an attachment mechanism operable for maintaining the second spindle in a first position with respect to the first spindle and further operable for maintaining the second spindle in a second position with respect to the first spindle.

In still another aspect, a method for rotating helicopter rotor blades coupled to a rigid rotor assembly from a deployed position to a stowed position is provided. The method includes removing at least one retention pin from a first aperture on a first spindle and a second aperture on a second spindle, the first aperture being aligned with the second aperture, the spindles configured for attachment of rotor blades thereto, rotating the first spindle about an axis of the rigid rotor assembly such that the first aperture on the first spindle is aligned with a third aperture on the second spindle, and inserting the at least one retention pin into the first aperture and the third aperture.

BRIEF DESCRIPTION OF THE DRAWINGS

FIG. 1 is a top view of a helicopter having a rigid rotor assembly and four main rotor blades in a deployed position.

FIG. 2 is a top view of a helicopter having a rigid rotor assembly and four main rotor blades in a stowed position.

FIG. 3 is an exemplary rigid rotor assembly, without rotor blades, illustrated in a deployed configuration.

FIG. 4 is the exemplary rigid rotor assembly of FIG. 3 illustrated in a stowed configuration.

FIG. 5 is a view of the exemplary rigid rotor assembly of FIG. 3 with an upper spindle removed.

DETAILED DESCRIPTION

The subject matter of the present disclosure is described with specificity herein to meet statutory requirements. However, the description itself is not intended to limit the scope of the claimed subject matter. Rather, the inventors have contemplated that the claimed subject matter might also be embodied in other ways, to include different steps or combinations of steps similar to the ones described in this document, in conjunction with other present or future technologies. Moreover, although the terms “step,” “block,” and/or “operation” may be used herein to connote different elements of methods employed, the terms should not be interpreted as implying any particular order among or between various steps herein disclosed unless and except when the order of individual steps is explicitly described.

Referring now to the drawings, and more particularly to FIG. 1, a helicopter is indicated in its entirety by reference numeral 50. In embodiments, the helicopter 50 has a fuselage, generally indicated at 52, including a forward section 54 and an aft section 56 (e.g., a tail section) rearward of the forward section 54. The helicopter 50 further includes a rigid rotor assembly, generally indicated at 58, extending upwards from the forward section 54 of the fuselage 52, and at least four rotor blades coupled to the rigid rotor assembly 58 configured for rotation about a rigid rotor axis $X_r$. In embodiments, the helicopter 50 may include more than one rigid rotor assembly 58. In the illustrated embodiment, the rigid rotor assembly 58 includes four rotor blades, for example, a first rotor blade 60, a second rotor blade 62, a third rotor blade 64, and a fourth rotor blade 66. However, embodiments that incorporate fewer or additional rotor blades are contemplated. In embodiments, the rigid rotor assembly 58 further includes a lower spindle 302 and an upper spindle 304, which are described in additional detail below with respect to FIG. 3.

Continuing with FIG. 1, the four rotor blades 60, 62, 64, and 66 are illustrated in a deployed, or first, position. In embodiments, a deployed position is a position in which the rotor blades 60, 62, 64, and 66 are orientated such that the helicopter 50 is ready for flight operations. For example, when in a deployed position, the first rotor blade 60 extends radially outwardly from the rigid rotor assembly 58 generally in a first direction, the third rotor blade 64 extends radially outwardly from the rigid rotor assembly 58 generally in a second direction opposite the first direction. The second rotor blade 62 extends radially outwardly from the rigid rotor assembly 58 generally in a third direction and the fourth rotor blade 66 extends radially outwardly from the rigid rotor assembly 58 generally in a fourth direction opposite the third direction. While the angle of separation of the two blade pairs is shown as being substantially perpendicular in this embodiment, other embodiments may have substantially different separation angles, particularly when additional rotor blades are incorporated. Generally, when deployed for flight operations, the rotor blades are evenly spaced. For example, in the illustrated embodiment, and described above, the blades are spaced at 90 degree intervals. For a six blade configuration, the spacing would be at 60 degrees.

Figure 2:
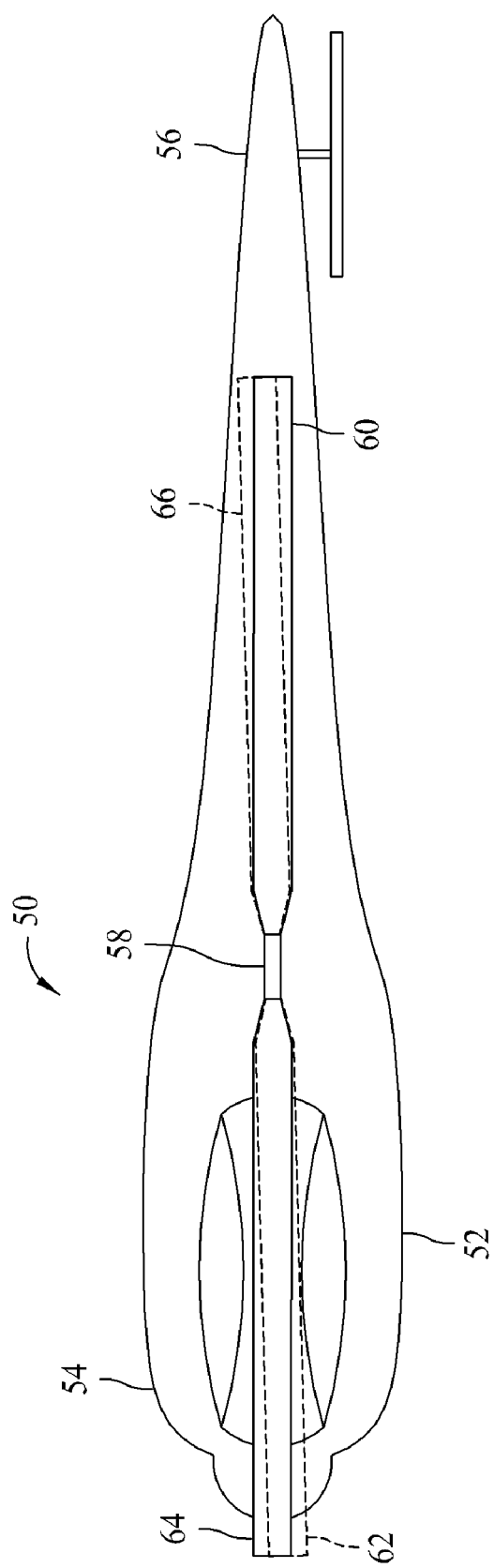

With reference now to FIG. 2, a top plan view of a helicopter having a rigid rotor assembly 58 and the four main rotor blades 60, 62, 64, and 66 in a stowed, or second, position is provided. In embodiments, when the four rotor blades 60, 62, 64, and 66 are in a stowed position, two of the four rotor blades 60, 62, 64, and 66 extend generally in a forward direction (e.g., toward the forward section 54) and the other two of the four rotor blades 60, 62, 64, and 66 extend in a rearward direction (e.g., toward the aft section 56). One of ordinary skill in the art will appreciate that a determination of which rotor blades will extend in a forward direction or which rotor blades will extend in a rearward direction (i.e., aft rotor blades) may be made at anytime during a folding operation. For example, in a deployed position, two rearward-most rotor blades may become aft rotor blades and the two forward-most blades become forward rotor blades. For exemplary purposes, as shown in FIG. 2, the first rotor blade 60 and the fourth rotor blade 66 are aft rotor blades, and the second rotor blade 62 and the third rotor blade 64 are forward rotor blades. For simplicity, a folding operation of the first rotor blade 60 and the third rotor blade 64 will be described herein in detail below, with reference to the rigid rotor assembly shown in FIG. 3.

Figure 3:
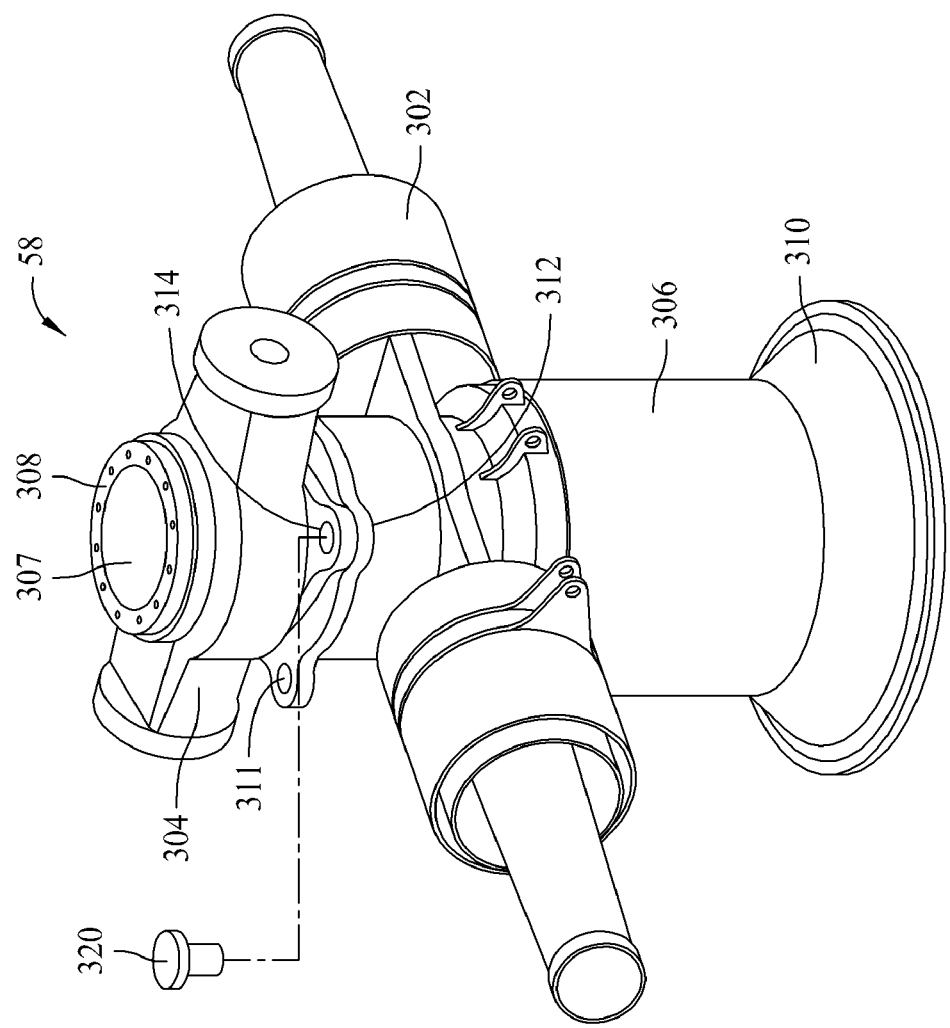

FIG. 3 is an illustrative example of the rigid rotor assembly 58. For clarity, the rotor blades 60, 62, 64, and 66 are not shown in FIG. 3. In embodiments, the rigid rotor assembly 58 includes the lower spindle 302 (which is sometimes referred to herein as a first spindle), the upper spindle 304 (which is sometimes referred to herein as a second spindle), and a housing 306 that covers a majority of shaft 307. In embodiments, the shaft 307 extends through a base 310 of the housing 306 and a cylindrical portion of this shaft 307 extends through each of the lower spindle 302 and the upper spindle 304. In embodiments, the lower spindle 302 engages a portion of the shaft 307 via a spline interface (not shown) or other effective torque coupling mechanism. In other words when the shaft 307 rotates, the lower spindle 302 rotates along with the shaft 307. In further embodiments, the upper spindle 304 is maintained in an axial position with respect to an upper end of the shaft 307 through a nut 308 that is secured to the top of the shaft 307. In one embodiment, the engagement between the nut 308 and the shaft 307 further creates a compression fit between the upper spindle 304 and the bottom spindle 302. That is, in embodiments, the upper spindle 304 includes a hub opening and slides over the shaft 307 and is compressed down onto the lower spindle 302 by securing the upper spindle 304 to the shaft with a nut 308. It should be noted that in such an embodiment, the upper spindle 304 is free to rotate with respect to the shaft 307 but for any resistance to rotation resulting from the above described compression fit.

In embodiments, the nut 308 is configured to screw on to the top of the shaft 307, engage the upper spindle 304 and further compress the upper spindle 304 against the bottom spindle 302. In further embodiments, the lower spindle 302 and the upper spindle 304 include an attachment mechanism (e.g., pin receiving apertures and at least one pin) operable for maintaining the upper spindle 304 in a deployed position with respect to the lower spindle 302 and further operable for maintaining the upper spindle 304 in a stowed position with respect to the lower spindle 302. For example, the upper spindle 304 has at least one pin receiving aperture 314 and the lower spindle 302 has at least two pin receiving apertures 311 and 312. In the embodiment shown in FIG. 3, the lower spindle 302 includes pin receiving apertures 311 and 312, and the upper spindle 304 includes a pin receiving aperture 314. However, as FIG. 3 is only illustrative in nature, and due to the viewing angle of FIG. 3, FIG. 3 illustrates only one pin receiving aperture (the pin receiving aperture 314) on the upper spindle 304. However, in one specific embodiment, a second pin receiving aperture is located at an opposite side of the upper spindle 304 from aperture 314. Further, FIG. 3 illustrates only two pin receiving apertures (the pin receiving apertures 311 and 312) on the bottom spindle 302. However, in one specific embodiment, two other pin receiving apertures are located at the opposite side of the bottom spindle 304 and opposite respective apertures 311 and 312.

Figure 1:
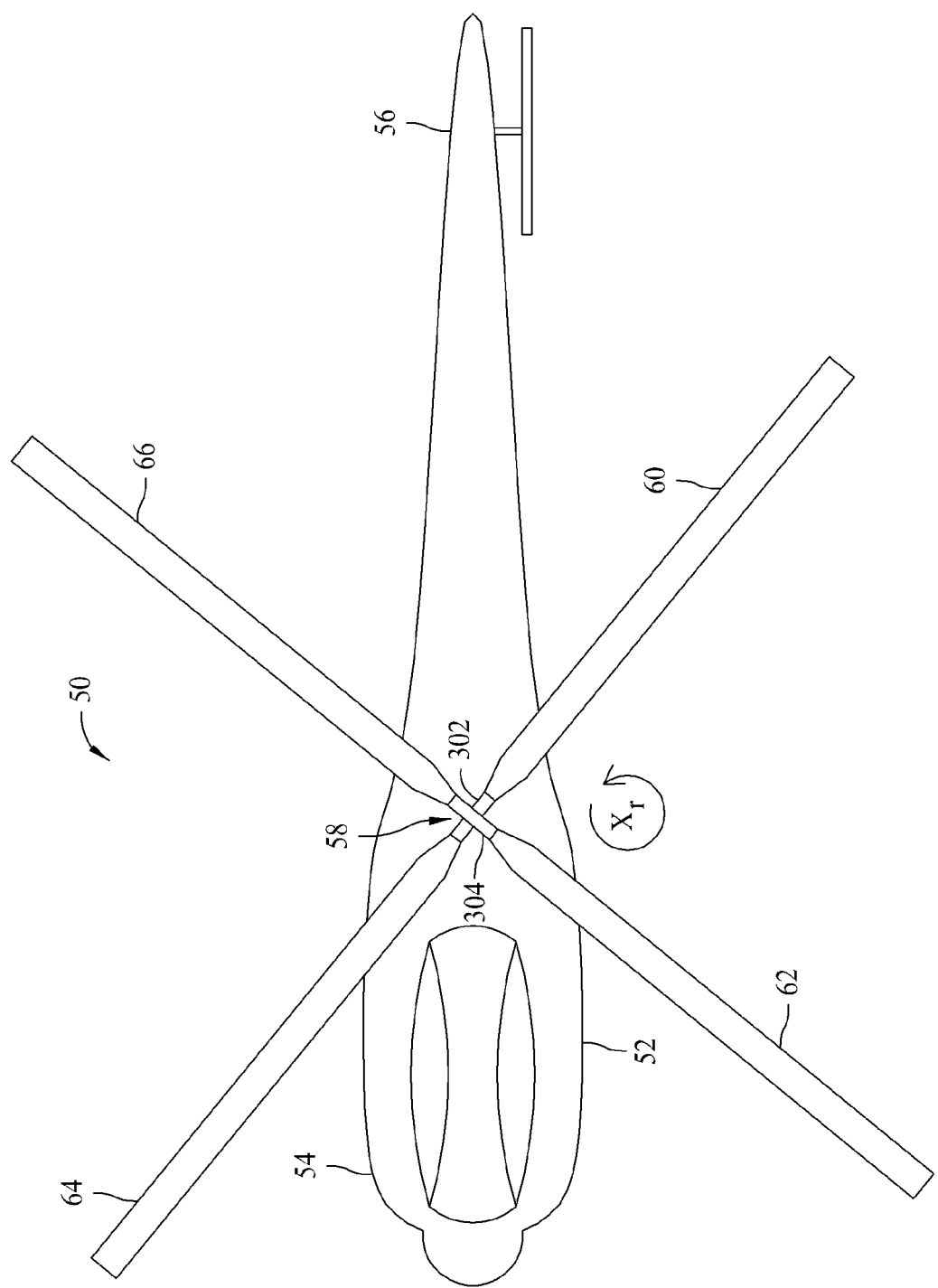
Figure 4:
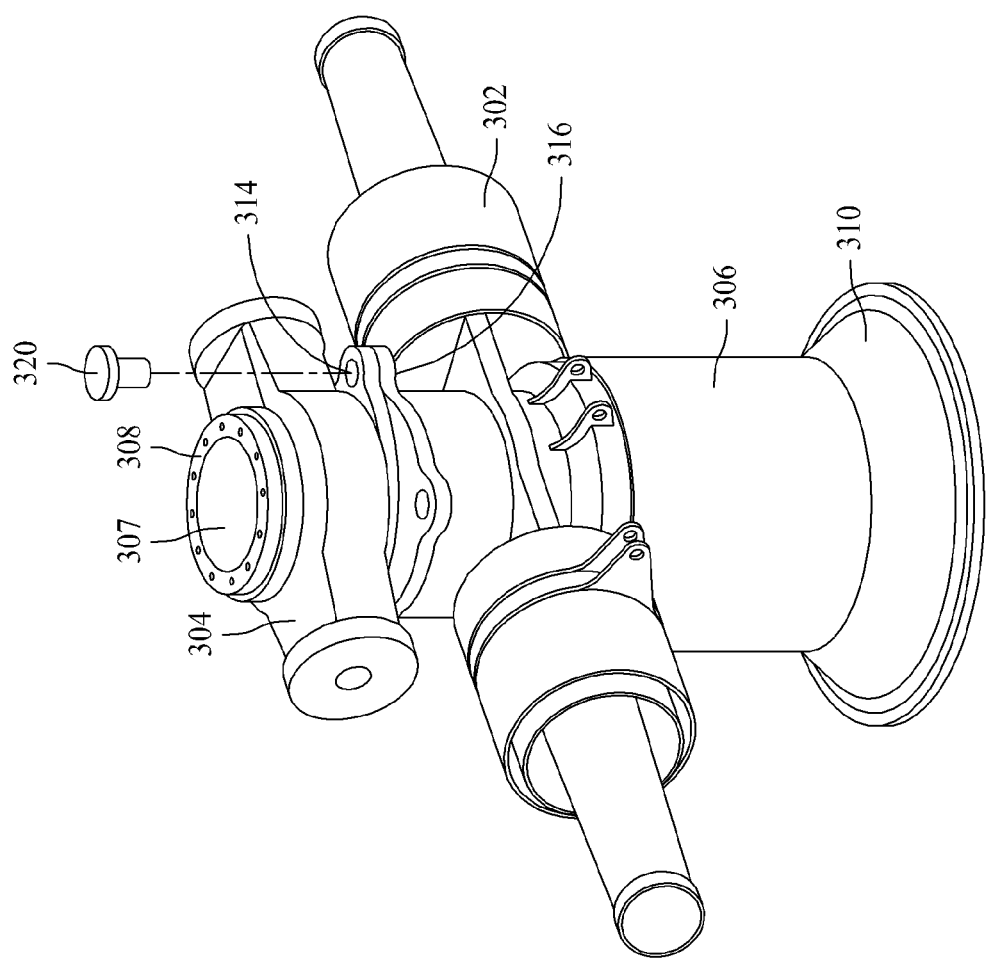

With continued reference to FIG. 3, the upper spindle 304 and the lower spindle 302 are shown in a deployed position, for example, as illustrated in FIG. 1. An illustrative example of the rigid rotor assembly 58 in a stowed position is shown in FIG. 4. In embodiments, when in the deployed position, the pin receiving aperture 314 of the upper spindle 304 is aligned with the pin receiving aperture 312 of the lower spindle 302. In further embodiments, the upper spindle 304 is held in the deployed position by inserting a retention pin 320 into the pin receiving apertures 312 and 314. In this embodiment, a second pin would also be inserted into the opposite pin receiving aperture on the upper spindle 304 and into an opposite pin receiving aperture on the bottom spindle 302. Embodiments that incorporate additional apertures and pins are contemplated. Thus, the configuration of the rigid rotor assembly 58 facilitates rapid insertion and removal of each retention pin 320 from or into pin receiving apertures of the upper spindle 304 and the bottom spindle 302. Therefore, rotating two of the four rotor blades 60, 62, 64, and 66 to and from a stowed position and a deployed position requires no additional ground support equipment or a removal of large cumbersome components.

Figure 5:
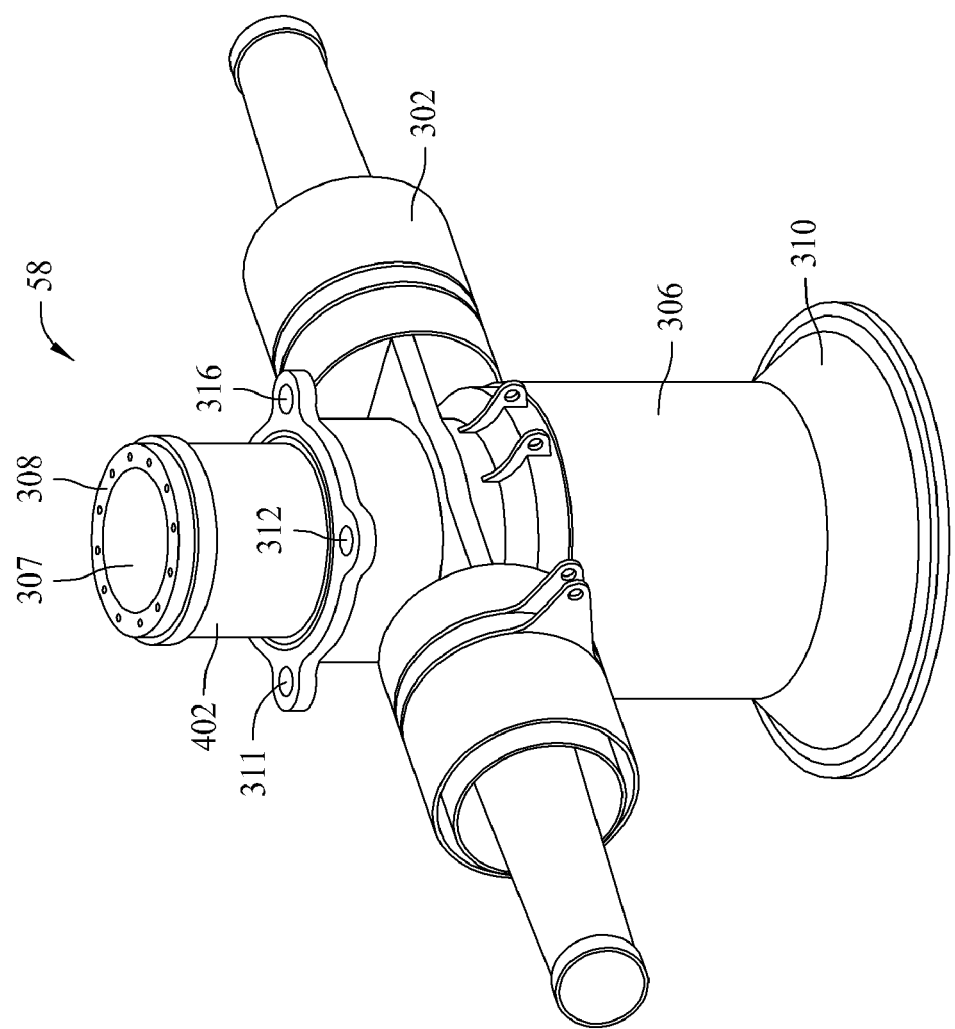

With continued reference to FIG. 3, for simplicity, it will be assumed herein that rotor blades attached to the lower spindle 302, for example, the rotor blades 62 and 66, are currently in a stowed position. That is, in the current example, although all of the four rotor blades 60, 62, 64, and 66 begin in a deployed position, the rotor blade 62 extends in a forwardly direction and the rotor blade 66 extends in a rearwardly direction. Therefore, to place all of the four rotor blades 60, 62, 64, and 66 into a stowed position, only the first rotor blade 60 and the second rotor blade 64 need to be rotated. However, if the rotor blades 62 and 66 attached to the lower spindle 302 are in a deployed position and are not extending in a forwardly direction and a rearwardly direction, one may manually or electrically rotate the rotor blades 62 and 66 into a forwardly direction and a rearwardly direction. In embodiments, to rotate the rotor blades attached to the upper spindle 304, for example the rotor blades 60 and 64, into a stowed position (as shown in FIG. 5) from a deployed position, each retention pin 320 inserted through each pin receiving aperture in the upper spindle 304 is first removed. For example, the retention pin 320 in the pin receiving apertures 312 and 314 is removed.

Once all of the retention pins 320 are removed, the rotor blades 60 and 64 attached to the upper spindle 304 may be rotated between a deployed position and a stowed position. Thus, the rotor blades 60 and 64 attached to the upper spindle 304 are rotated about the rigid rotor axis $X_r$ of the rigid rotor assembly 58. It is to be understood that each of the first rotor blade 60 and the third rotor blade 64 are attached to the upper spindle 304, therefore, each of the first rotor blade 60 and the third rotor blade 64 are rotated between a deployed position and a stowed position simultaneously in substantially the same manner. That is, because the first rotor blade 60 and the third rotor blade 64 are each attached to the upper spindle 304, as the first rotor blade 60 is rotated between a deployed position and a stowed position, the third rotor blade 64 will also be rotated between a deployed position and a stowed position.

In embodiments, and as shown in FIG. 4, once each of the first rotor blade 60 and the third rotor blade 64, and therefore the upper spindle 304, are rotated into a stowed position, for example, when the pin receiving aperture 314 of the upper spindle 304 is aligned with the pin receiving aperture 316 of the lower spindle 302, a retention pin 320 is inserted into the pin receiving aperture 314 of the upper spindle 304 and the pin receiving aperture 316 of the lower spindle 302 to hold the first rotor blade 60 and the third rotor blade 64 in the stowed position.

With reference now to FIG. 5 an illustrative view of the rigid rotor assembly 58 is shown with the upper spindle 304 being removed from view. In embodiments, an upper spindle bearing 402 is included on the shaft 307 and configured for rotational engagement with the upper spindle 304 (not shown in FIG. 5). In one embodiment, the upper spindle bearing 402 is separate from the shaft 307 and surrounds a portion of the shaft 306 between the lower spindle 302 and the nut 308. In embodiments, the upper spindle bearing 402 is configured to reduce wear and tear on the shaft 306 caused by a rotation of the upper spindle 304. FIG. 5 also illustrates a third pin receiving aperture 416.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rigid rotor assembly configured to allow rotation of helicopter rotor blades attached to the rigid rotor assembly from a deployed position to a stowed position, the rigid rotor assembly comprising:
   a) a base comprising a shaft extending therethrough;
   b) a first spindle comprising a first aperture, the first spindle configured to engage the shaft, the first spindle further configured to have a first plurality of rotor blades attached thereto; and
   c) a second spindle comprising a second aperture and a third aperture, the second spindle configured to have a second plurality of rotor blades attached thereto, the second spindle further configured for placement onto the shaft, the second spindle operable to maintain the second plurality of rotor blades in a deployed position with respect to the first plurality of rotor blades via a first retention pin inserted through the first aperture and the second aperture, the second spindle further operable to maintain the second plurality of rotor blades in a stowed position with respect to the first plurality of rotor blades by removing the first retention pin from the first aperture and the second aperture and inserting the first retention pin or a second pin through the first aperture and the third aperture.

2. The rigid rotor assembly according to claim 1, wherein:
   the shaft comprises a spline formed thereon; and
   the first spindle is configured to engage the spline formed on the shaft.

3. The rigid rotor assembly according to claim 1, wherein the shaft further comprises a nut configured to ensure retention of the first spindle and the second spindle to the shaft under flight loading.

4. A helicopter comprising:
   a forward section;
   a tail section rearward of the forward section; and
   a rigid rotor assembly configured to allow rotation of helicopter rotor blades attached to the rigid rotor assembly from a deployed position to a stowed position, the rigid rotor assembly comprising:
   a first spindle attached to a rotor shaft, the first spindle comprising a first plurality of rotor blades attached thereto and a first aperture; and
   a second spindle, the second spindle comprising a second plurality of rotor blades attached thereto, a second aperture, a third aperture, and a hub opening operable for placing the second spindle onto the shaft, the second spindle operable for maintaining the second plurality of rotor blades in a deployed position with respect to the first plurality of rotor blades by inserting a first retention pin through the first aperture and the second aperture, the second spindle further operable for maintaining the second plurality of rotor blades in a stowed position with respect to the first plurality of rotor blades by removing the first retention pin from the first aperture and the second aperture and inserting the first retention pin or a second retention pin through the first aperture and the third aperture.

5. The helicopter according to claim 4, wherein the first spindle is attached to the shaft via a spline.

6. The helicopter according to claim 4, wherein the shaft further comprises a nut configured to ensure retention of the first spindle and the second spindle to the shaft under flight loading.

7. A method for rotating helicopter rotor blades coupled to a rigid rotor assembly from a deployed position to a stowed position, the method comprising:
   removing at least one retention pin from a first aperture on a first spindle and a second aperture on a second spindle, the first aperture being aligned with the second aperture, the spindles configured for attachment of rotor blades thereto;
   rotating the first spindle about an axis of the rigid rotor assembly such that the first aperture on the first spindle is aligned with a third aperture on the second spindle; and
   inserting the at least one retention pin into the first aperture and the third aperture.

8. The method according to claim 7, wherein:
   alignment of the first aperture and the second aperture is operable to place rotor blades associated with the spindles into a deployed position; and
   alignment of the first aperture and the third aperture is operable to place rotor blades associated with the spindles into a stowed position.

9. The method according to claim 8, wherein the stowed position describes a first portion of the rotor blades extending generally toward a forward section of a helicopter and a second portion of the rotor blades extending generally toward a tail section of the helicopter.

* * * * *